US012761604B2

(12) United States Patent
Kaelin et al.

(10) Patent No.: US 12,761,604 B2
(45) Date of Patent: Oct. 13, 2026

(54) DIAL, WATCH COMPRISING SUCH A DIAL AND METHOD FOR INSTALLING SUCH A DIAL IN A WATCH

(71) Applicant: ETA SA MANUFACTURE HORLOGÈRE SUISSE, Grenchen (CH)

(72) Inventors: Laurent Kaelin, Sonvilier (CH); Zoé Schaffter, Corban (CH); Matthieu Erard, Courroux (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 876 days.

(21) Appl. No.: 17/693,966

(22) Filed: Mar. 14, 2022

(65) Prior Publication Data

US 2022/0404772 A1 Dec. 22, 2022

(30) Foreign Application Priority Data

Jun. 21, 2021 (EP) .................................... 21180540

(51) Int. Cl.
*G04B 19/14* (2006.01)
*G04B 19/06* (2006.01)

(52) U.S. Cl.
CPC ........... *G04B 19/14* (2013.01); *G04B 19/065* (2013.01)

(58) Field of Classification Search
CPC ....... G04B 19/14; G04B 19/065; G04B 19/12
USPC .......................................................... 668/232
See application file for complete search history.

(56) References Cited

U.S. PATENT DOCUMENTS

| | | | |
|---|---|---|---|
| 554,511 A | 2/1896 | Hart |
| 6,357,908 B1 | 3/2002 | Hunziker |
| 8,817,580 B2 | 8/2014 | Leoni et al. |
| 2018/0224805 A1 | 8/2018 | Kawata |
| 2021/0103252 A1 | 4/2021 | Jacquot et al. |

FOREIGN PATENT DOCUMENTS

| | | |
|---|---|---|
| CH | 709 401 A2 | 9/2015 |
| CH | 709401 B1 | 9/2015 |
| CN | 103576531 A | 2/2014 |
| CN | 102968041 B | 3/2015 |
| EP | 2685326 A1 | 1/2014 |
| EP | 3 070 539 A1 | 9/2016 |
| EP | 3 276 432 A1 | 1/2018 |
| EP | 3712713 A1 | 9/2020 |

(Continued)

OTHER PUBLICATIONS

Partial machine translation of Krahenbuhl (CH 709401) (Year: 2015).*

(Continued)

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A dial including an external parts plate (11) intended to be visible for a user, resting on a bearing surface (120) of a support plate (12) on which it is superimposed, the external parts plate (11) and the support plate (12) being fastened to one another at their periphery by the cooperation of peripheral fastening members that they both include, and at their centre by the cooperation of central fastening members that they both include.

12 Claims, 2 Drawing Sheets

(56) References Cited

FOREIGN PATENT DOCUMENTS

| | | | |
|---|---|---|---|
| GB | 2 079 497 | A | 1/1982 |
| JP | 56126586 | U | 9/1981 |
| JP | 57-199885 | U | 12/1982 |
| JP | 59-979 | U | 1/1984 |

OTHER PUBLICATIONS

Notice of Reason For Refusal issued Mar. 22, 2023 by the Japanese Patent Office in Japanese Application No. 2022-042221.

European Search Report for EP 21 18 0540, dated Nov. 19, 2021.

* cited by examiner

DIAL, WATCH COMPRISING SUCH A DIAL AND METHOD FOR INSTALLING SUCH A DIAL IN A WATCH

CROSS REFERENCE TO RELATED APPLICATIONS

This application claims priority to European Patent Application No. 21180540.3 filed Jun. 21, 2021, the entire contents of which are incorporated herein by reference.

TECHNICAL FIELD OF THE INVENTION

The invention lies in the field of horology, and in particular that of horological components.

More particularly, the invention relates to a dial, for example made from a fragile material, a watch comprising such a dial, a method for installing said dial in a watch and a method for disassembling said dial.

TECHNOLOGICAL BACKGROUND

For aesthetic reasons, certain watch dials are made from fragile material, for example from mother-of-pearl, from stone, from ceramic, from glass, etc.

To fasten this type of dial inside a watch case, generally, an external parts plate made from the fragile material is glued onto a support plate fastened to a horological movement housed in the case, or directly onto the middle of the watch.

The disadvantage of this type of dial lies in the high sensitivity to shocks of the external parts plate insofar as the fragile material does not have a capacity for plastic deformation when it is subjected to a mechanical stress and is therefore liable to break or crack if the watch undergoes a shock.

Moreover, when the watch is subjected to a shock, in addition to deteriorating the external parts plate, if the support plate is deformed, it can push the hands to come loose.

Finally, the issue of the resistance of the dial to shocks must be considered even more because these requirements are defined by the conditions of the quality standard NIHS_91-10, which any watch produced must respect.

More generally, there is a need to propose a dial, the sensitivity of which to mechanical stresses resulting from a shock of the watch is reduced, so as to avoid or limit any damage to said dial.

SUMMARY OF THE INVENTION

The invention resolves the aforementioned disadvantages by proposing a solution allowing to reduce the stresses to which the dial is subjected when the watch in which it is housed undergoes a shock.

For this purpose, the present invention relates to a dial comprising an external parts plate intended to be visible for a user, said external parts plate resting on a bearing surface of a support plate on which it is superimposed.

The external parts plate and the support plate are fastened to one another at their periphery by the cooperation of peripheral fastening members that they both include, and they are fastened to one another at their centre by the cooperation of central fastening members that they both include.

This feature allows, by generating a fastening of the external parts plate and of the support plate to one another, both at their periphery and at their centre, to reduce the mechanical stresses undergone by the external parts plate and thus to greatly limit or avoid any deformation of the external parts plate during a possible shock of the watch.

Such a feature allows the use of fragile materials to form the external parts plate.

Moreover, this solution for mechanical fastening allows to eliminate any means for gluing the plates to each other, which allows to simplify the process of manufacturing such a dial.

Moreover, the invention allows to be able to provide identical watches, during their manufacturing, with dials having different appearances.

In specific embodiments, the invention can further include one or more of the following features, taken alone or according to all the technically possible combinations.

In specific embodiments, the peripheral fastening members of the external parts plate and of the support plate are configured to cooperate with each other in a removable manner, as well as the central fastening members of the external parts plate and of the support plate, so as to be able to disconnect said external parts and support plates from one another.

This feature allows to be able to modify the appearance of the dial at any time during the life of the watch simply, by changing only the external parts plate of the dial, without having to handle the horological movement.

In specific embodiments of the invention, the peripheral fastening members of the external parts plate include at least one radial tab, and the peripheral fastening members of the support plate include at least one catch forming a notch, said at least one catch being configured so that the notch receives in insertion said at least one radial tab.

In specific embodiments of the invention, the peripheral fastening members of the support plate include a pin extending from the bearing surface of the support plate and an elastic bracket elbowed with respect to said bearing surface and separated from said pin by a space forming an interstice into which a radial protrusion of the external parts plate is inserted, said elastic bracket being capable of being deformed elastically by said radial protrusion during its insertion into the interstice.

In specific embodiments of the invention, the external parts plate is configured so that the or one of the radial tabs is capable of being stopped against a side of the pin opposite to the elastic bracket when the external parts and support plates are disconnected from one another.

In specific embodiments of the invention, the central fastening members of the external parts plate are formed by a central opening, the transverse cross-section of which has a non-circular shape, and the central fastening members of the support plate include a cylindrical sleeve inserted through the central opening of the external parts plate and fastened by one of its ends to a central opening of the support plate, said sleeve including at its other end a collar, the transvers cross-section of which has a shape complementary to that of the transverse cross-section of the central opening of the external parts plate.

In specific embodiments of the invention, the shape of the transverse cross-sections of the collar and of the central opening of the external parts plate includes at least one arc of a circle connected to at least one rectilinear segment.

According to another aspect, the present invention relates to a watch comprising a case defining an inner volume in which a dial as described above and a horological movement intended to drive hour and minute hands are housed, the external parts plate being fastened to the support plate, itself fastened to a plate of said horological movement.

Yet another aspect of the invention relates to a method for installing in a watch a dial as described above, said method including the following successive steps:

- fastening the support plate to the plate of a horological movement, for example by screwing,
- disposing the external parts plate so that it rests against the bearing surface of the support plate, the sleeve being inserted through the central opening of the external parts plate,
- rotating the external parts plate with respect to the support plate, about a central axis perpendicular to the bearing surface, so that the peripheral fastening members and the central fastening members of the external parts plate cooperate with the peripheral fastening members and with the central fastening members of the support plate.

In specific embodiments of the invention, when the external parts plate is pivoted with respect to the support plate, the tab(s) are housed in the notches.

In specific embodiments of the invention, when the external parts plate is pivoted with respect to the support plate, the radial protrusion is housed in the interstice formed between the pin and the elastic bracket.

In specific embodiments of the invention, when the external parts plate is pivoted with respect to the support plate, the collar covers a part of said external parts plate in order to form an axial banking.

In specific embodiments of the invention, during the step of disposing the external parts plate against the bearing surface of the support plate, one of the radial tabs is stopped against a side of the pin opposite to the elastic bracket.

Yet another aspect of the present invention relates to a method for disassembling a dial as described above comprising the steps of:

- stressing the elastic bracket so as to maintain it in a manner aligned with the bearing surface of the support plate,
- rotating the external parts plate with respect to the support plate about a central axis perpendicular to the bearing surface, so as to remove the radial protrusion from the interstice, and
- removing the external parts plate by translation of said external parts plate according to the central axis.

In specific embodiments of the invention, the rotation of the external parts plate is carried out until the or one of the radial tab(s) is stopped against the pin on a side of said pin opposite to the elastic bracket.

BRIEF DESCRIPTION OF THE DRAWINGS

Other features and advantages of the invention will appear upon reading the following detailed description given as an example that is in no way limiting, in reference to the appended drawings in which.

DETAILED DESCRIPTION OF THE INVENTION

Figure 1:
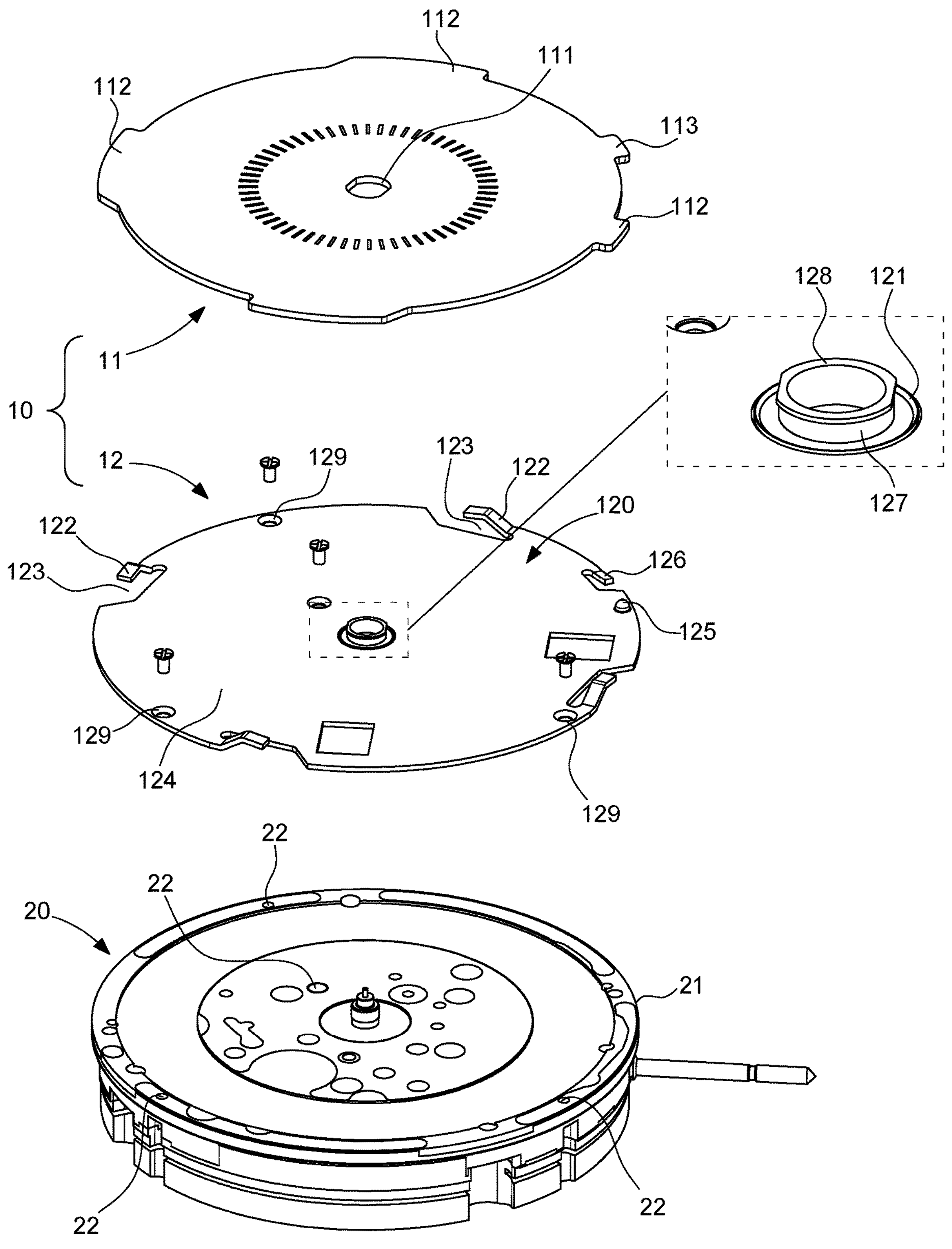
FIG. 1 shows an exploded perspective view of the assembly of a dial according to a preferred exemplary embodiment of the invention with a horological movement.

The present invention relates to a dial 10 and its arrangement in a watch, and more particularly in a watch case.

For reasons of clarity, the watch and in particular the watch case are not shown in the drawings.

The case houses, in a conventional manner, a horological movement 20 in an inner volume defined between a glass and a back. The dial 10 is intended to be fastened onto a plate 21 of the horological movement 20 as shown in the exploded view of FIG. 1 and is arranged between the latter and the glass.

Hour, minute and optionally second hands (also not shown in the drawings) are intended to be driven in rotation by the horological movement 20, between the dial 10 and the glass.

As visible in FIG. 1, the dial 10 is formed by two plates, one of which, called “external parts plate” 11, for example made from a fragile material, is intended to be visible for a user, and the other of which, called “support plate” 12, is preferably made from a metal material and is intended to be interposed between the external parts plate 11 and the horological movement 20.

The notion of “fragile material” is well known to a person skilled in the art and designates a material capable of breaking or cracking, without deforming, under the effect of a mechanical stress, such as a shock. In other words, a fragile material does not have a capacity for plastic deformation when it is subjected to a mechanical stress.

For example, fragile materials can be stone, glass, mother-of-pearl, quartz, ceramic, etc.

When the dial 10 is assembled, the external parts plate 11 rests on a bearing surface 120 of the support plate 12.

The external parts plate 11 and the support plate 12 advantageously each include peripheral fastening members cooperating with each other, and central fastening members cooperating with each other. The cooperation of the peripheral fastening members with each other, as well as the cooperation of the central members with each other, mechanically link said external parts plate 11 and said support plate 12 to one another.

This feature allows, by generating a fastening of the external parts plate 11 and of the support plate 12 to one another, both at their periphery and at their centre, to limit the mechanical stresses undergone by the external parts plate 11 and thus to strongly reduce or avoid any deformation of the external parts plate 11 during a possible shock of the watch.

The external parts 11 and support 12 plates include, in a conventional manner, a central opening 111, 121 extending according to a shared central axis perpendicular to the bearing surface 120 and parallel to an axial direction, said central openings 111 and 121 being intended to receive the axis of the hands. In general, the external parts 11 and support 12 plates can receive any arrangement known to a person skilled in the art, such as recesses provided to form apertures, etc., without going beyond the context of the present invention.

Advantageously, the peripheral fastening members of the external parts plate 11 and of the support plate 12 are configured to cooperate with each other in a removable manner, just like the central fastening members of the external parts plate 11 and of the support plate 12.

Thus, it is possible to disconnect said external parts 11 and support 12 plates from one another, which is in particular useful to replace the external parts plate 11.

As shown by FIG. 1 in an exemplary embodiment of the invention, the peripheral fastening members of the support plate 12 include at least one catch 122 forming a notch 123.

More particularly, in the exemplary embodiment shown in the drawings, the support plate 12 includes four catches 122.

The catches 122 are formed on the periphery of the support plate 12 and extend lengthwise in tangential planes perpendicular to radial directions. Said catches 122 each include a portion called "end portion" 1220 arranged parallel to the bearing surface 120 and at a distance from the latter. The end portion 1220 is connected to a body 124 of the support plate 12 by a junction portion 1221.

The peripheral fastening members of the external parts plate 11 include at least one radial tab 112 extending from the periphery of the external parts plate 11.

In the exemplary embodiment shown in the drawings, the support plate 12 includes four radial tabs 112, each of which is intended to be inserted into a notch 123.

Figure 2:
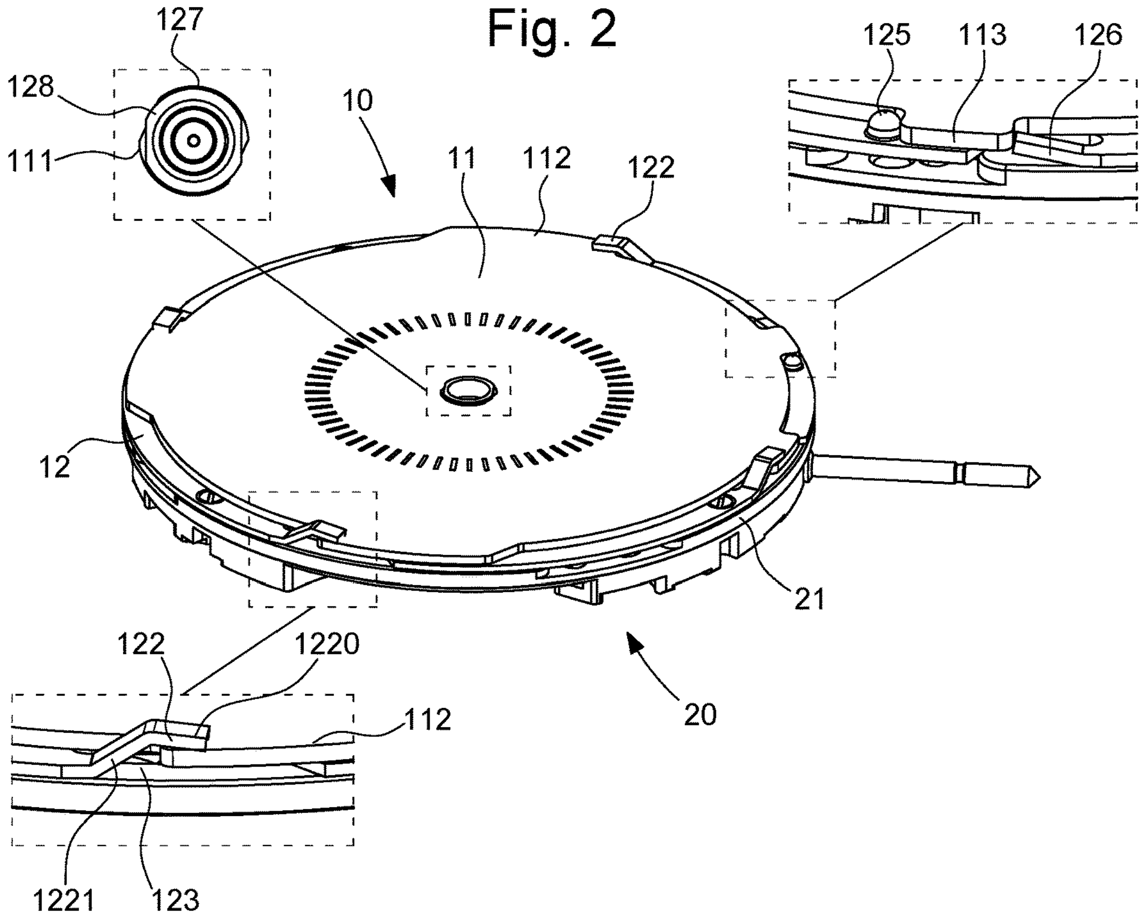
FIG. 2 shows a perspective view of the assembly of FIG. 1, in which an external parts plate of the dial is fastened to a support plate of the dial.

As shown by a detail view of FIG. 2, each catch 122, by its end portion 1220, is intended to maintain axially in position the radial tab 112 with which it cooperates. It is understood here that the external parts plate 11 is maintained in position between the body 124 of the support plate 12, because of its bearing against the bearing surface 120, and of the catch(es) 122, because of its contact with the end portion 1220 of the catch(es) 122.

The peripheral fastening members of the support plate 12 can further comprise a pin 125 extending from the bearing surface 120 according to an axis substantially parallel to the axial direction, and an elastic bracket 126, deformable in deflection and elbowed, that is to say inclined, in a direction opposite to the horological movement 20, as shown by a detail view of FIG. 2.

The pin 125 has a length substantially equal to the thickness of the external parts plate 11, so that its free end is flush with the visible face of the external parts plate 11, as shown by the detail view of FIG. 2.

The elastic bracket 126 extends lengthwise in a tangential plane perpendicular to a radial direction between an end by which it is connected to the body 124 of the support plate 12 and a free end oriented towards the pin 125.

The elastic bracket 126 and the pin 125 are separated from one another by a space forming an interstice in which a radial protrusion 113 of the external parts plate 11 is inserted.

The radial protrusion includes an end wall connecting to each other two lateral flanks substantially parallel to one another, said wall and said lateral flanks being defined in the edge of the external parts plate 11.

Advantageously, the elastic bracket 126 is elbowed with respect to the body 124 of the support plate 12 according to an angle such that its free end is arranged bearing against the edge of the radial protrusion 113, and more particularly one of the lateral flanks of said radial protrusion 113, so as to form a banking for stopping the external parts plate 11 in rotation about the central axis.

More particularly, the radial protrusion 113 is arranged in the interstice in a tight fit, so as to forbid any angular travel of the external parts plate 11, with respect to the support plate 12, about the central axis.

FIG. 2 shows a detail view showing an exemplary embodiment in which the central fastening members of the external parts plate 11 are formed by its central opening 111, the transverse cross-section of which is non-circular, and in which the central fastening members of the support plate 12 include a cylindrical sleeve 127 inserted through said central opening 111.

More particularly, the sleeve 127 is fastened to the central opening 121 of the support plate 12 by one of its ends, and protrudes beyond the bearing surface 120 by its other end, called "free end", as shown in the detail view of FIG. 1.

The sleeve 127 comprises, at its free end, a radial collar 128, the transverse cross-section of which has a shape complementary to that of the transverse cross-section of the central opening 111 of the external parts plate 11. In other words, the transverse cross-section of the radial collar 128 has a shape similar to that of the transverse cross-section of the central opening 111 of the external parts plate 11, plus or minus the mechanical play.

This feature allows to dispose the external parts plate 11 against the bearing surface 120 of the support plate 12 by inserting the sleeve 127 through the central opening 111 of the external parts plate 11. Moreover, the sleeve 127 advantageously allows to carry out a centring in position of the external parts plate 11 relative to the support plate 12.

The non-circular shape of the transverse cross-section of the central opening 111 of the external parts plate 11 allows the radial collar 128, by pivoting the external parts plate 11 with respect to the support plate 12 about the central axis, to cover a part of said external parts plate 11 so as to form an axial banking, as shown by the detail view of FIG. 2.

In the exemplary embodiment shown in the drawings, the aforementioned transverse cross-sections include two diametrically opposite arcs of a circle connected to each other by two rectilinear segments.

This shape of a transverse cross-section has the advantage of being simple to create.

Alternatively, the transverse cross-sections can comprise a single rectilinear segment and a single arc of a circle, or any polygonal or elliptical shape.

The dial 10 is advantageously fastened to the plate 21 of the horological movement 20 by the support plate 12, preferably in a removable manner. For example, the support plate 12 is screwed to said plate 21. A maintaining plate can optionally be arranged between the plate 21 and the support plate 12, as shown by the exploded view of FIG. 1.

Thus, it is possible to disconnect the external parts 11 and support 12 plates from the horological movement 20.

In the preferred embodiment shown in FIG. 1, the support plate 12 includes on its periphery a plurality of through-holes 129, for example three, provided to receive a screw, the threaded rod of which cooperates with threaded holes 22 made in the plate 21.

Moreover, the support plate 12 is preferably fastened to said plate 21 by a screw closer to the central opening 121 of said plate than the other screws arranged on its periphery, said screw also cooperating with a threaded hole 22 made in said plate 21.

The present invention extends to a method for installing the dial 10 in a watch, and to a method for disassembling said dial 10.

The method includes a first step of fastening the support plate 12, preferably by screwing, to the plate 21 of the horological movement 20.

Figure 3:
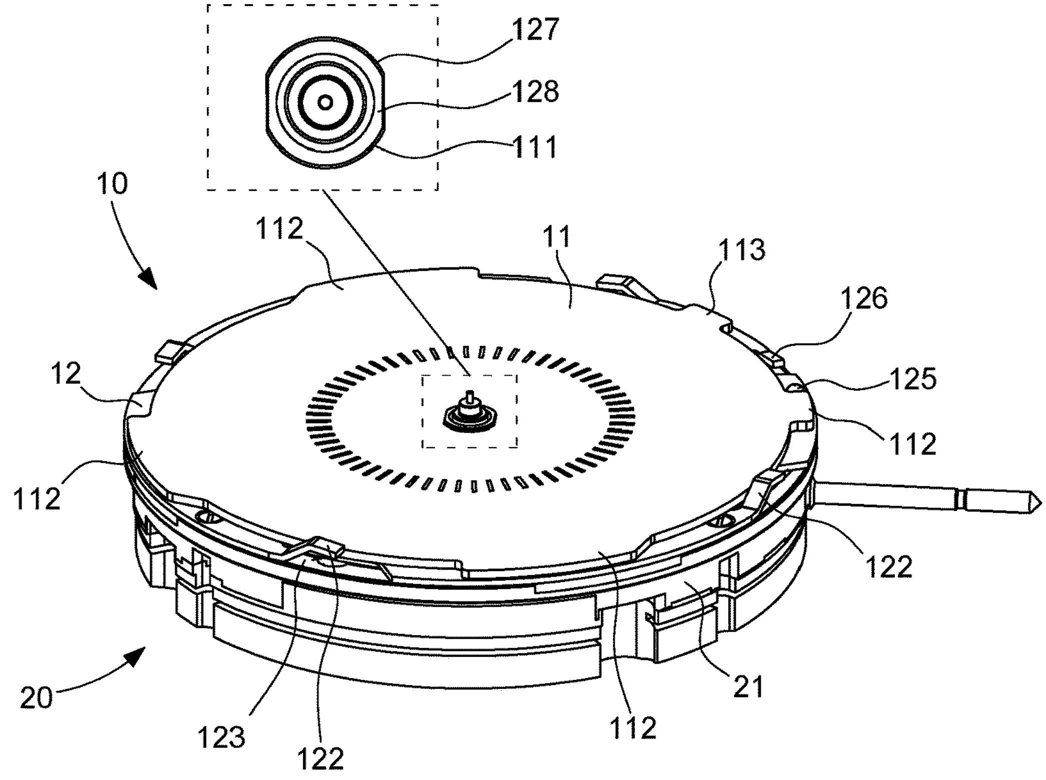
FIG. 3 shows a perspective view of the assembly of FIG. 1, in which the external parts plate occupies an angular position allowing its removal from the support plate, and thus the disassembly of the dial.

Then the external parts plate 11 is applied against the support plate 12 so as to rest against its bearing surface 120, the sleeve 127 being inserted through the central opening 111, as shown in FIG. 3.

In this first relative position of the external parts 11 and support 12 plates, the radial collar 128 is aligned with the central opening 111 of the external parts plate 11, so that the projections of the transverse cross-section of the radial tab 128 and of that of said central opening 111 coincide with one another, plus or minus the mechanical play, as illustrated by the detail view of FIG. 3.

To facilitate the carrying out of this step, the external parts plate 11 can be configured so that one of the radial tabs 112 is intended to be stopped against the pin 125 on a side of said pin 125 opposite to the elastic bracket 126 when the sleeve 127 is inserted through the central opening 111 of the external parts plate 11. Such an arrangement, visible in FIG. 3, also plays a role of poka-yoke for the assembly of the external parts 11 and support 12 plates.

Then, the external parts plate 11 is pivoted about the central axis so as to advance the radial protrusion 113, until it is housed in the interstice formed between the pin 125 and the elastic bracket 126. In the exemplary embodiment shown in the drawings, the direction of rotation of the dial 10 is the clockwise direction, but in other exemplary embodiments, the direction of rotation could be the anticlockwise direction.

During the rotation of the external parts plate 11, with a view to its insertion into the interstice, the radial protrusion 113 deforms the elastic bracket 126 in deflection by applying a force with an axial component going against elastic return stresses generated by said elastic bracket 126, so as to align it with the body 124 of the support plate 12. Once said radial protrusion 113 is housed in the interstice, bearing against the pin 125, it no longer constrains the elastic bracket 126 which thus goes back to its elbowed rest state and forms a banking for stopping the external parts plate 11 in rotation about the central axis, as shown in the detail view of FIG. 2.

Moreover, this step also has the effect of angularly offsetting the central opening 111 of the external parts plate 11 relative to the sleeve 127, so that the radial collar 128 covers a part of said external parts plate 11 and forms an axial banking, and of housing the radial tabs 112 in the notches 123, as shown by the detail views of FIG. 2.

The external parts 11 and support 12 plates are thus fastened to one another.

Advantageously, said plates are assembled to one another in a reversible manner, the peripheral and central fastening members of the external parts plate 11 and of the support plate 12 cooperating respectively with each other in a removable manner.

To disconnect the external parts 11 and support 12 plates, the elastic bracket 126 is stressed so as to be aligned with the body 124 of the support plate 12, and the external parts plate 11 is pivoted about the central axis in order to remove the radial protrusion 113 from the interstice. This rotation is carried out in the anticlockwise direction in the exemplary embodiment shown in the drawings, but in other exemplary embodiments, the direction of rotation to disconnect the external parts 11 and support 12 plates could be the clockwise direction.

Advantageously, the radial tabs 112 are dimensioned so that when one of them is stopped, by one of its lateral flanks, against the side of the pin 125 opposite to the elastic bracket 126, the peripheral fastening members and the central fastening members of the external parts 11 and support 12 plates are respectively disconnected from each other. More particularly, the radial tabs 112 are removed from the notches 123 and the projections of the transverse cross-section of the radial collar 128 and of that of the central opening 111 of the external parts plate 11 coincide with one another, plus or minus the mechanical play, so that it is possible to remove the external parts plate 11 from the support plate 12 by translation according to the axial direction.

The invention claimed is:

1. A dial (10) comprising:

a support plate (12);

an external parts plate (11) visible for a user, said external parts plate (11) resting on a bearing surface (120) of the support plate (12) on which the external parts plate is superimposed; and peripheral and central fastening members respectively provided on the support plate and the external parts plate, the external parts plate (11) and the support plate (12) being fastened to one another at their periphery by the cooperation of the peripheral fastening members, and being fastened to one another at their centre by the cooperation of the central fastening members, wherein the peripheral fastening members of the external parts plate (11) and of the support plate (12) are configured to cooperate with each other in a removable manner, and the central fastening members of the external parts plate (11) and of the support plate (12) are configured to cooperate with each other in a removable manner, so as to be able to disconnect said external parts (11) and support (12) plates from one another without damaging the external parts plate, and wherein the peripheral fastening members of the external parts plate (11) include at least one radial tab (112), and wherein the peripheral fastening members of the support plate (12) include at least one catch (122) forming a notch (123), said at least one catch (122) being configured so that the notch (123) receives in insertion said at least one radial tab (112), wherein said at least one catch (122) includes an end portion (1220) arranged parallel to the bearing surface (120) in a first radial direction, and wherein the peripheral fastening members of the support plate (12) include a pin (125) extending from the bearing surface (120) of the support plate (12) and an elastic bracket (126) extending in a second radial direction opposite to the first radial direction and is elbowed with respect to said bearing surface (120), said elastic bracket (126) being separated from said pin (125) by a space forming an interstice into which a radial protrusion (113) of the external parts plate (11) is inserted, said elastic bracket (126) being capable of being deformed elastically by said radial protrusion (113) during its insertion into the interstice.

2. The dial (10) according to claim 1, wherein the external parts plate (11) is configured so that said at least one radial tab (112) is capable of being stopped against a side of the pin (125) opposite to the elastic bracket (126) when the external parts (11) and support (12) plates are disconnected from one another.

3. The dial (10) according to claim 1, wherein the central fastening members of the external parts plate (11) are formed by a central opening (111), the transverse cross-section of which has a non-circular shape, and wherein the central fastening members of the support plate (12) include a cylindrical sleeve (127) inserted through said central opening (111) and fastened by one of its ends to a central opening (121) of the support plate (12), said sleeve (127) including at its other end a radial collar (128), the transverse cross-section of which has a shape complementary to that of the transverse cross-section of the central opening (111) of the external parts plate (11).

4. The dial (10) according to claim 3, wherein the shape of the transverse cross-sections of the radial collar (128) and of the central opening (111) of the external parts plate (11) includes at least one arc of a circle connected to at least one rectilinear segment.

5. A watch comprising a case defining an inner volume in which a dial (10) according to claim 1 and a horological movement (20) intended to drive hour and minute hands are housed, the external parts plate (11) being fastened to the support plate (12), itself fastened to a plate (21) of said horological movement (20).

6. A method for installing a dial (10) according to claim 1 in a watch, including the following successive steps:

fastening the support plate (12) to the plate (21) of a horological movement (20), disposing the external parts plate (11) so that it rests against the bearing surface (120) of the support plate (12), and rotating the external parts plate (11) with respect to the support plate (12), about a central axis perpendicular to the bearing surface (120), so that the peripheral fastening members and the central fastening members of the external parts plate (11) cooperate respectively with the peripheral fastening members and with the central fastening members of the support plate (12).

7. The method according to claim 6, wherein, when the external parts plate (11) is pivoted with respect to the support plate (12), the at least one radial tab housed in at least one notch (123).

8. The method according to claim 7, wherein, when the external parts plate (11) is pivoted with respect to the support plate (12), a radial protrusion (113) is housed in interstice formed between the pin (125) and the elastic bracket (126).

9. The method according to claim 8, wherein, when the external parts plate (11) is pivoted with respect to the support plate (12), a radial collar (128) covers a part of said external parts plate (11) in order to form an axial banking.

10. The method according to claim 7, wherein during the step of disposing the external parts plate (11) against the bearing surface (120) of the support plate (12), said at least one radial tab is stopped against a side of said pin (125) opposite to the elastic bracket (126).

11. A method for disassembling a dial (10) according to claim 1, comprising the steps of:

stressing the elastic bracket (126) so as to maintain it in a manner aligned with the bearing surface (120) of the support plate (12), rotating the external parts plate (11) with respect to the support plate (12) about a central axis perpendicular to the bearing surface (120), so as to remove the radial protrusion (113) from the interstice, and removing the external parts plate (11) by translation of said external parts plate (11) according to the central axis.

12. The method for disassembling a dial (10) according to claim 11, wherein the rotation of the external parts plate (11) is carried out until said at least one radial tab is stopped against a side of said pin (125) opposite to the elastic bracket (126).

* * * * *